United States Patent
Grandprey et al.

(10) Patent No.: US 6,458,268 B1
(45) Date of Patent: Oct. 1, 2002

(54) INDUSTRIAL WASTE WATER TREATMENT CLEANING APPARATUS

(75) Inventors: Greg Grandprey, Circle Pines, MN (US); Gary Lee Champion, Overland Park, KS (US)

(73) Assignee: Ecolab Inc., St. Paul, MN (US)

(*) Notice: Subject to any disclaimer, the term of this patent is extended or adjusted under 35 U.S.C. 154(b) by 0 days.

(21) Appl. No.: 09/597,106

(22) Filed: Jun. 20, 2000

Related U.S. Application Data (60) Provisional application No. 60/140,224, filed on Jun. 22, 1999.

(51) Int. Cl.⁷ ................................................. C02F 1/52
(52) U.S. Cl. ............... 210/96.1; 210/101; 210/143; 210/199; 210/206; 210/257.1; 210/258; 8/158; 68/12.13
(58) Field of Search ............... 8/158, 159; 68/17 R, 68/902, 208, 12.13; 210/709, 96.1, 101, 143, 199, 205, 206, 202, 257.1, 258

(56) References Cited

U.S. PATENT DOCUMENTS

| | | | |
|---|---|---|---|
| 3,605,775 A | * 9/1971 | Zaander et al. | 210/709 |
| 4,855,061 A | * 8/1989 | Martin | 210/709 |
| 5,076,937 A | * 12/1991 | Montgomery | 210/705 |
| 5,160,439 A | * 11/1992 | Dobrez et al. | 210/709 |
| 5,523,000 A | 6/1996 | Falbaum et al. | 210/708 |
| 5,807,487 A | * 9/1998 | Lahti | 210/665 |
| 6,240,585 B1 | * 6/2001 | Preachter et al. | 8/158 |

OTHER PUBLICATIONS

"Electronic Metering Pumps Installation Maintenance Troubleshooting", LMI Milton Roy Liquid Metronics Division, 23 pgs. (1996).

"Instruction Manual Series A9, B9, and C9 Electronic Metering Pumps", LMI Milton Roy Liquid Metronics Division, 19 pgs. (1997).

"Instruction Supplement Series B9 Electronic Metering Pump", LMI Milton Roy Liquid Metronics Division, 4 pgs.

* cited by examiner

Primary Examiner—Peter A. Hruskoci
(74) Attorney, Agent, or Firm—Merchant & Gould P.C.

(57) ABSTRACT

A method and apparatus for controlling waste water treatment is disclosed. A feed-forward controller adjusts chemical injection pumps in response to signals from the contaminant zone, while delays to accommodate the time required for the contaminated water to reach the reaction or DAF tank are provided. Flow rate information from downstream of an equalization tank, but upstream of the chemical injection pumps, is monitored. By using both the data from the contamination points and the flow meter, the chemical injection pumps more accurately provide the necessary amount of chemicals to accommodate both volume of contaminated water and contaminant concentrations in the waste water.

9 Claims, 4 Drawing Sheets

INDUSTRIAL WASTE WATER TREATMENT CLEANING APPARATUS

This application claims the benefit of provisional application 60/140,224 filed on Jun. 22, 1999.

FIELD OF THE INVENTION

This invention relates generally to an industrial waste water treatment cleaning method and apparatus. More particularly, the invention relates to the monitoring of conditions at the water contamination site and feeding information relating to the monitored conditions forward to a waste water treatment cleaning controller.

BACKGROUND

Waste water treatment facilities are used to reduce and/or eliminate contaminants in water used in industrial settings. For example, water which is used in industrial laundries is often contaminated with dirt, dyes, oils, greases, ink and other chemicals. Prior to discharging the water into the public sanitary sewer (or other discharge outlet), the water is treated. The treatment process generally includes an equalization tank for providing a more uniform output of water, a flow meter for monitoring the output from the equalization tank, and a series of pumps for injecting water treatment chemicals. A dissolved air flotation tank ("DAF" tank) is located downstream of the series of pumps. The DAF tank is the location where the chemical reactions occur (e.g., the reactions between the injected chemicals and the contaminants in the waste water), where air is injected into the water, and where skimming of solids occurs. More specifically with regard to the chemical reactions, such reactions are commonly known as flocculation and coagulation which are discussed briefly further below.

The drawbacks of such prior art systems generally stem from the non-uniformity of the concentrations and the unknown types of the contaminants in the water. However, even if the contaminants are known, because of the delays associated with the contaminants reaching the DAF tank from the various contamination points, it has been difficult to adjust the amount of injected chemicals to coincide with the actual contaminated water reaching the DAF tank.

Several types of systems have attempted to provide sensors to determine the types of contaminants which are contained in the waste water. However, these systems suffer in that the sensors are intrusive into the system and may become fouled by the waste water. Further, the physical nature of such systems require a time delay for the actual contaminants reaching the reaction tank.

In view of the above, there is a need for a method and apparatus for quantitatively identifying when a more severely contaminated volume of waste water will be discharged and for more accurately treating the waste water by elevating the amount of injected chemicals at the correct time (e.g., when such contaminated waste water reaches the reaction or DAF tank).

SUMMARY

The present invention addresses the foregoing problems of the prior art industry by achieving more precise control of the injected chemicals with a feed-forward controller apparatus and method. The present invention achieves improved control by adjusting the chemical injection pumps in response to signals from the contaminant zone. This control is performed with any necessary delays to accommodate the time required for the contaminated water to reach the reaction or DAF tank. The present invention also continuously monitors flow rate information from a meter which is located downstream of the equalization tank and upstream of the chemical injection pumps. By using both the data from the contamination points and the flow meter, the chemical injection pumps more accurately provide the necessary amount of chemicals to accommodate both volume of contaminated water and contaminant concentrations in the waste water. By these and other improvements, actual injected chemical usage is optimized and the discharged water is more uniformly treated.

The invention provides both a method and apparatus for receiving the necessary input signals from both the contamination points and the flow meter(s). The received signals are processed and the delay from the associated contamination point is determined and a flag is set. When the necessary delay has occurred, the processor increases or boosts the injection rate of the treatment chemicals in accordance with the received signals. Such increases may be additive depending on the number and type of signals received from the contamination points. Additionally, if the flow meter is experiencing an increase flow rate, then the processor may boost the injection rate in response thereto.

One advantage of the present invention is that the concentration of the chemicals used to treat the waste water is delivered as the actual soils reach the reaction tank. This is accomplished without introducing sophisticated sensors into the waste water stream. Instead, the type of soils being introduced are monitored at the contamination points and a signal is transmitted to a controller. The controller determines the time and rate that chemicals should be introduced in order to optimize the concentrations in the reaction tank.

Therefore, according to one embodiment constructed in accordance with the principles of the present invention, there is provided an apparatus for controlling the injection of chemicals in a waste water treatment facility, comprising: means for monitoring one or more contamination sites and generating a contamination signal in response to the type of contamination; a flow meter for monitoring the volume of waste water discharged from the contamination site and for generating a flow volume signal; a metering device for portioning a chemical into the waste water, the metering device operating in response to a control signal; and a controller operatively connected to the monitoring means and the flow meter, the controller receiving the contamination signal and the flow volume signal and generating a control signal for the metering device in response, whereby the amount of chemical for treating the waste water is optimized.

According to another embodiment constructed in accordance with the principles of the present invention, there is provided a method of controlling the addition of chemicals to waste water from a waste water contamination site, the method comprising the steps of: monitoring one or more contamination sites and generating a contamination signal in response to the type of contamination; measuring the volume of waste water discharged from the contamination site and generating a flow volume signal; portioning a chemical into the waste water in response to a control signal; and integrating the contamination signal and the flow volume signal, and generating a control signal for portioning the chemical in response, whereby the amount of chemical for treating the waste water is optimized.

In further accordance with the principles of the present invention, there is provided an apparatus for controlling the introduction of chemicals into waste water from one or more laundry washer sites, comprising: a monitor device at the one or more laundry washer sites for generating a feed forward signal in response to the type of contamination; an equalization tank for collecting the waste water from the one or more laundry washer sites; a chemical treatment tank; a fluid communication means for directing the waste water from the equalization tank to the chemical treatment tank; a flow meter, installed in the second fluid communication means, for monitoring the volume of waste water discharged from the equalization tank and for generating a flow volume signal responsive thereto; a plurality of pumps for introducing waste water treatment, chemicals into the waste water in response to control signals, wherein the pumps introduce the chemicals in the second fluid communication means; and a controller operatively connected to the monitor device and the flow meter, the controller receiving the feed forward signal and the flow volume signal and generating a control signal for the pumps in response, whereby the amount of chemical for treating the waste water is optimized.

These and other advantages and features which characterize the present invention are pointed out with particularity in the claims annexed hereto and forming a further part hereof. However, for a better understanding of the invention and the advantages obtained by its use, reference should be made to the drawing which forms a further part hereof, and to the accompanying descriptive matter, in which there is illustrated and described a preferred embodiment of the present invention.

DETAILED DESCRIPTION

As mentioned above, the principles of this invention apply to the automatic monitoring of contaminant sources and volume flow in a waste water treatment setting. The controller of the present invention provides for varying the injection of waste water chemical treatment sources based on input signals provided by the various contaminant sources and flow meters. This invention provides feed-forward data which taken together with the appropriate delays for the physical plant in which the present invention is employed provides the desired concentration of chemicals to properly treat the water—concurrently with the arrival of the contaminated water at the DAF tank. A preferred application for this invention is in the laundry washing environment. However, such application is typical of only one of innumerable types of applications in which the principles of the present invention can be employed.

One feature of the present invention is employing timed and/or measured signals from a contaminating site. Such signals may be analog or digital. The signals contain data on the type and/or amount of contamination occurring at the site. By integrating these feed forward signals with the equalization process, the contaminated fluid from the contamination site is more efficiently treated.

In order for a better understanding of the invention, a discussion of a preferred embodiment constructed in accordance with the principles of the present invention will be deferred pending a brief discussion of flocculation and coagulation.

First, flocculation or coagulation is defined as a process in which fine particles suspended in a liquid, typically aqueous medium form, form stable aggregates called "flocs." The degree of flocculation can be defined mathematically as the number of particles in a system before flocculation divided by the number of particles (flocs) after flocculation. Flocculation makes the suspension non-homogeneous on a microscopic scale. The non-homogeneity of the suspension can then lead to easy separation. A complete or partial separation of the solids from the liquid phase can then be made by using a number of different mechanical separation devices.

Flocculating agents are commonly considered to be synonymous with coagulation agents and are commonly chemical materials, that at a relatively low concentration in a typically aqueous medium, compared to the weight of the particulates in the suspension, increase the degree or rate of flocculation of the suspension. Flocculating agents or coagulating agents act at a molecular level on the surfaces of the particles to reduce repulsive forces and to increase attractive forces driving the interparticle interaction towards a coagulation or flocculation reaction.

Coagulants or flocculants can be classified as organic or inorganic. The discussions of useful flocculating agents and methods found in Falbaum et al., U.S. Pat. No. 5,523,000, are hereby fully incorporated by reference herein. Inorganic flocculants are commonly water-soluble salts of divalent or trivalent metal anions. For all practical purposes, these metals comprise anions of aluminum, iron, calcium and mixtures thereof. The useful materials currently in use as flocculating agents include aluminum sulfate, aluminum chloride hydroxide, sodium aluminate, ferric chloride, ferric sulfate, ferrous sulfate, calcium hydroxide and lime (calcium oxide). Organic flocculants are typically water-soluble natural (or derivatized natural) polymers or synthetic polymers. The use of natural products as flocculating agents has steadily declined as synthetic flocculants have replaced natural versions. Natural flocculants include starch and guar gum. Synthetic flocculants include acrylamide, acrylic polymers, polyamines and their derivatives, polyethylene oxide and allyl amine polymers. While there are no comprehensive theories of flocculation, three variables appear to affect results obtained in any flocculation system. The variations are type of flocculant, type of substrate and type of mechanical separation treatment of the flocculated substrate. Size and physical properties of flocks rather than degree of flocculation are the key elements in determining practical effectiveness of a particular application. Care must be taken in using the appropriate dilution for flocculating agent for the concentration of dissolved or suspended solids in the particular application. Flocculant solutions should be added in a continuous stream to maintain appropriate flocculant concentration. Flocculated particulates can be removed by settling and decantation, the use of filter belt presses and centrifuges, vacuum filters and other common mechanical separation equipment. Additive materials can increase floc size, density, resistance to share induced decomposition, etc; pH control can also be important. Producers of synthetic flocculants based on acrylamides include BASF, Betz Laboratories, Calgon, Sytec Industries, Floerger, Nalco, Polypure, Rohm GmbH, Sankyo Chemical Industries, Sanyo Chemical Industry, Sumitomo Chemical Company, Allied Colloids, Diaflock, Dow and others. Such suppliers can often provide detailed instructions regarding the mode of use, concentration, mode of addition and separation using the flocculants or coagulants.

Figure 1:
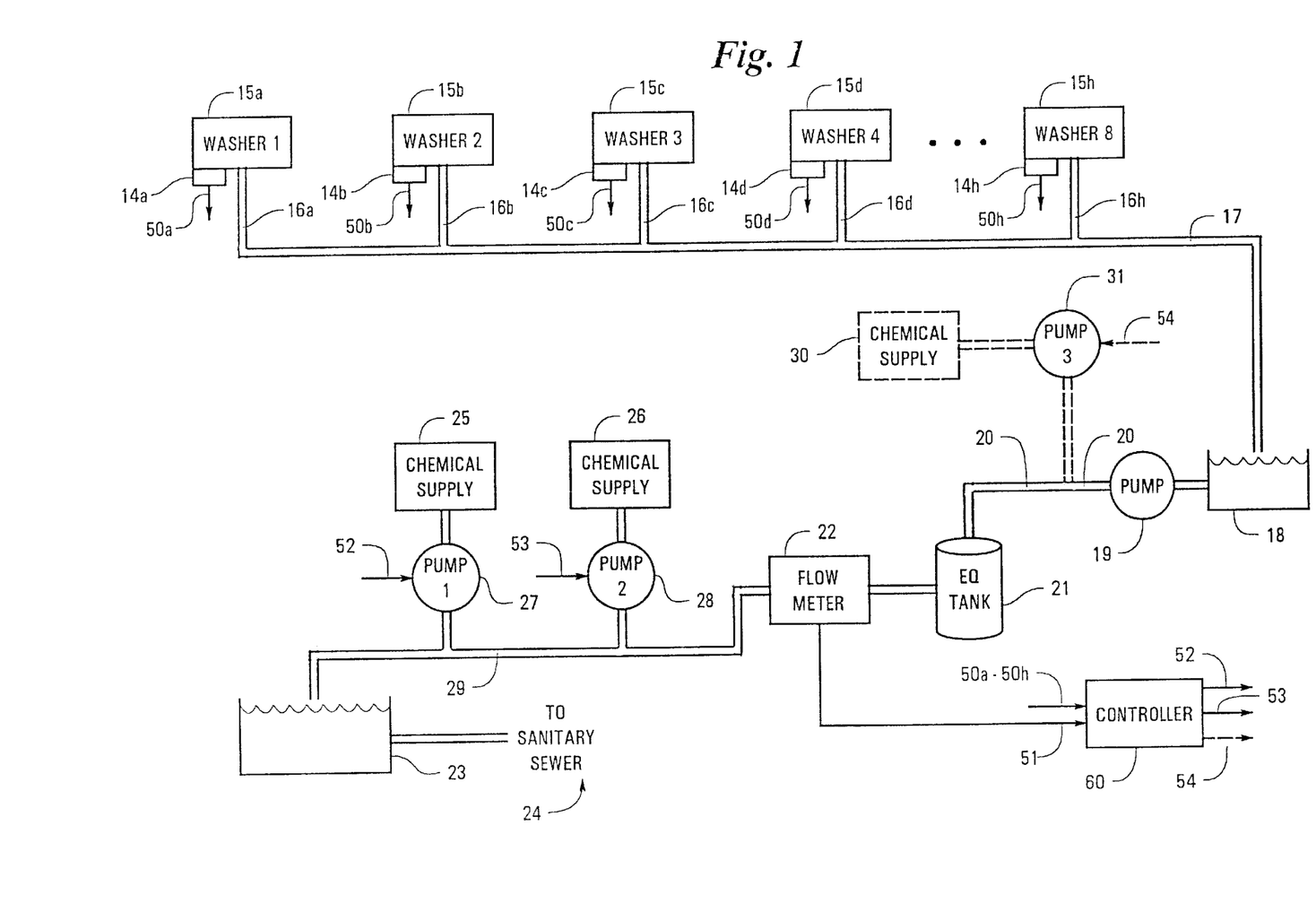
FIG. 1 illustrates a functional block diagram of an environment in which the present invention might be employed.

Referring now to FIG. 1, there is illustrated in an environment in which the present invention waste water controller method and apparatus may be employed. As noted above, such application is one of many innumerable types of environments in which the principals of the present invention may be utilized. Accordingly, such environment should not be taken in a limiting manner. Other such environments include treatment of gas refining, paper mill, and other waste water treatment facilities.

As used herein, the term "contamination point" refers generally to the location, machine or zone where the contaminants are introduced into the waste water. As noted in the preceding paragraph, an industrial laundry setting will be used and described as the preferred environment in the present application. Accordingly, the term "contamination point" in the present application will also be used to specifically refer to the one or more industrial washers which introduce contaminants during the normal washing cycle of various laundered items.

In FIG. 1, a plurality of washers for industrial laundry are identified by the designation 15(a)–15(h). The washers are connected to a collection drain 17 via individual drain pipes 16(a)–16(h) respectively. The water used during the laundering process is pumped out of the washers 15 via the drain pipes 16 during operation of the washers. The collection drain pipe 17 collects such waste water from the individual washers 15(a)–15(h) and distributes the waste water into sump 18. The collected waste water is moved from sump 18 via pump 19 and first fluid communication means 20 to equalization tank 21.

The equalization tank 21 is sized and configured for the specific environment. In many embodiments, the equalization tank 21 contains large quantities of collected waste water (e.g. on the order of 10,000–30,000 gallons) to provide an area in which to homogenize the concentration of the waste water from the various washers and to provide a more constant or uniform fluid flow to the treatment area. For example, because the individual washers 15 may be at different points of the wash cycle(s) at different times, a varying flow of waste water accumulates in the equalization tank 21. However, for treatment purposes, a more constant flow is desired. The equalization tank is generally sized and configured to store surplus amounts of fluid and release a relatively constant flow (e.g., a base line or steady state flow rate is established). Accordingly, the fluid level within the equalization tank 21 will vary but the fluid flow out of the equalization tank 21 will tend to be more uniform.

A flow meter 22 monitors the volume of fluid flow from the equalization tank via second fluid communication means 29. Generally, the fluid flow is between 30 to 150 gallons per minute in the preferred embodiment. Various types of flow meters may be used which are well known in the industry. For example either turbine or magnetic style flow meters may be used. In the preferred embodiment, the flow meter 22 provides an analog signal which is proportional to the fluid flow being measured. the output signal ranges from four to twenty mA. While the first and second fluid communication means 20, 29 are pipes sized and configured properly for the specific application, such means can be conduits and other open or closed troughs used to transport fluid.

Downstream of the flow meter 22 is the reaction tank, DAF tank 23. These types of tanks may vary in the environment in which they are used and are generally well known by those of skill in the art. Briefly, a typical DAF tank may be open and include a skimmer device. An air injection system may be included in the bottom of the tank, and the tank may be compartmentalized in order to establish a flow pattern within the tank. The treated water flows from the DAF tank 23 to the sanitary sewer 24 or other discharge outlet. It will be appreciated that other types of tanks which perform these or similar functions are intended to be included within the term reaction or DAF tank.

The chemicals utilized in treating the waste water are injected into the second fluid communication means 29 upstream of the DAF tank 23 by means of pumps 27 and 28. In the preferred embodiment, the pumps are electronic metering pumps which utilize microprocessor control manufactured by LMI division of Milton Roy (a Sundstrand Corporation) of Acton, Mass. under series number B9. A controller 60 receives input from flow meter 22 and washers 15(a)–15(h), to determine the rate at which pumps 27 and 28 should inject the treatment chemicals 25 and 26 respectively into the waste water just upstream of the DAF tank 23. As noted above, the treatment in the DAF tank includes skimming of collected flock particles as well as injection of chemicals to adjust pH and neutralize other chemicals. Accordingly, depending on the environment in which the present invention is employed, the chemical supplies 25 and 26 may vary. Further, the number of chemicals which are injected into the waste water may vary. In the present invention, two chemicals are illustrated. It will be appreciated by those of skill in the art, however, that one or more chemicals might be employed.

The operation of the controller 60 will be described in more detail below. However, for a better understanding of the operation of the present invention, a description of the controller 60 will next be presented in connection with FIG. 2.

Figure 2:
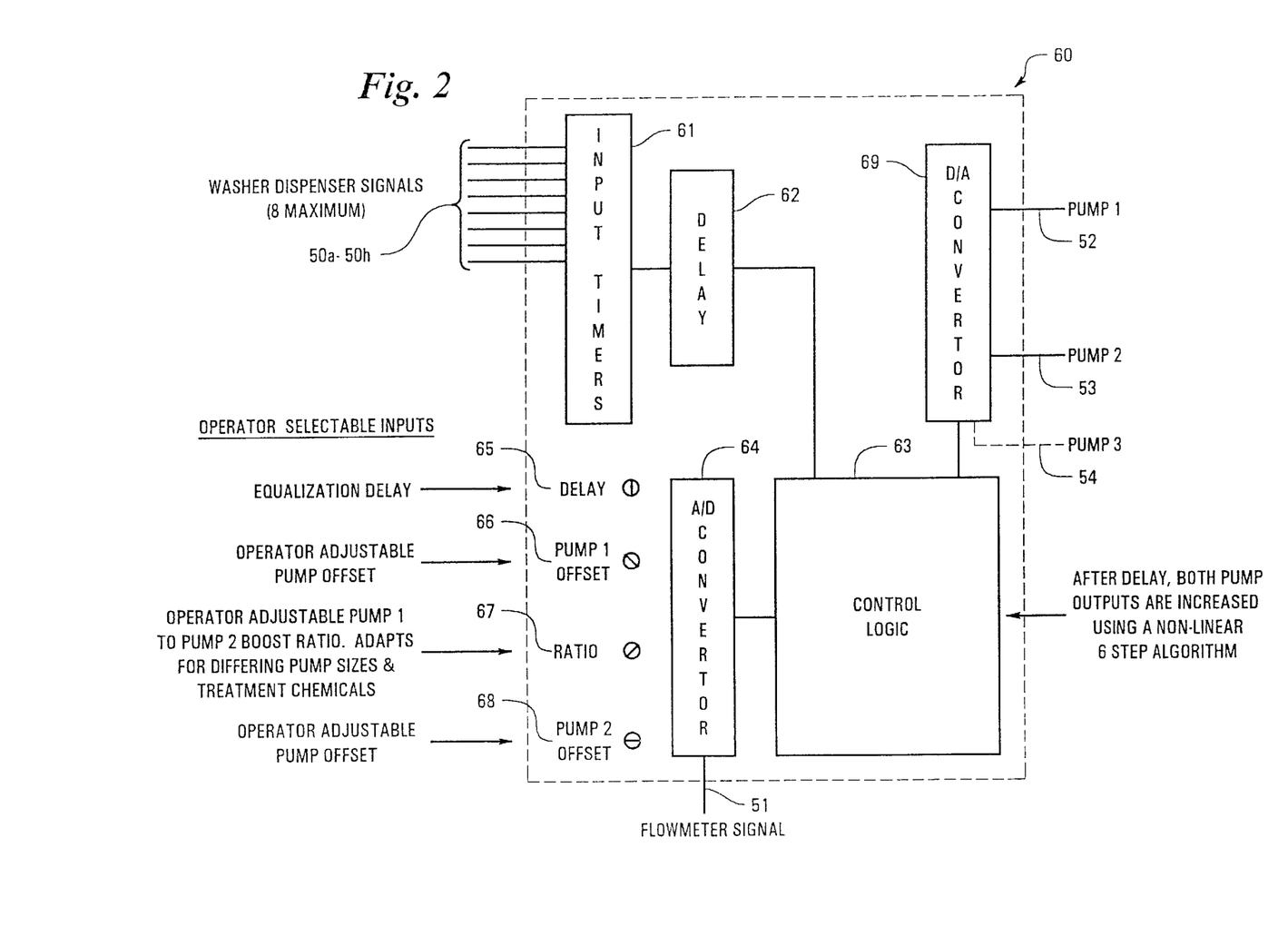
FIG. 2 illustrates a functional block diagram of the main components of the controller 60 of the present invention.

The controller apparatus 60 is illustrated in FIG. 2. Controller 60 includes an input block 61 for the washer signals 50(a)–50(h). The washer signals are timed at the input block and provided to delay block 62. These timed and delayed signals are then provided to control logic block 63. Also providing input to the control logic block 63 is the input from an analog to digital (A/D) converter block 64. This block 64 receives an analog signal from the flow meter 22 via line 51. As will be appreciated by those of skill in the art, the analog signal of the flow meter is converted to a digital signal and is then provided to the control logic block 63.

Also providing input to the control logic block 63 are four operator adjustable inputs. These inputs are an equalization delay signal 65, a pump 1 offset 66, a ratio signal 67, and pump 2 offset 68.

In regard to the delay signal input 65, as noted above, there are physical delays associated with the waste water being collected from the contamination points (e.g. washers 1–8), moving to the sump 18, pumped to the equalization tank 21, and eventually pumped to the DAF treatment area 23. Because of this delay, the delay signal input 65 is adjusted for the actual physical time delay associated with the contaminated water traversing through the actual physical properties of the environment in which the present invention is employed.

The pump 1 offset input 66 provides an input for adjusting the nominal injection of chemicals from the chemical supply block 25. More specifically, there is assumed to a be a normal level of contaminants in the waste water which is being treated. This "normal" contamination provides a base line level for operating first pump 27 continuously. In the present invention, this amount is adjustable to a rate which is between 0–50% capacity of the pump. It will be appreciated, however, that other percentages could be employed.

The next operator selectable input is the ratio selection 67. This selection provides for adjusting the ratio of the operation of first pump 27 in relation to second pump 28. For example, an operator of the present invention may select a ratio which increases the operation of one pump relative to the other. Setting the operation in this manner compensates for environments in which additional chemical needs to be employed relative to the other chemicals, differing pump sizes, etc. The ratio provides for relative operation between 60–140%. It will be appreciated, however, that other percentages could be employed.

Finally, second pump 28 offset selector 68 provides a base line for the normal operation of second pump 28. In the present embodiment, pump 2 offset equal to 0–50% to the operation of the pump. It will be appreciated, however, that other percentages could be employed.

The input to controller 60 from the washers 15a–15h is provided by the individual laundry controller(s) 14a–14h, each of which correspond to a laundry machine 15. In operation, when a user programs the washers 15(a)–15(h) to begin a laundry cycle, the type of objects being laundered is input. Based on empirically found data, the type of objects are known to release certain types and amounts of contaminants during laundering. Therefore, the signal from the laundry controllers 14a–14h to the controller 60 differs based on the type of laundry being processed. For example, loads which include higher concentrations of contaminants or of differing contaminants may provide for longer signals. As shown in the following table, there may be a hierarchy of signals associated with the differing types of laundry loads.

TABLE 1

| Signal Duration | Type of Laundry Load |
| --- | --- |
| 20 Seconds | Shop Ink Towels |
| 15 Seconds | Bar Towels |
| 15 Seconds | Heavy Shirts |
| 5 Seconds | Shirts |
| 0 Seconds | Walk-off Mats |
| 0 Seconds | Sheets |

It will be appreciated by those of skill in the art that such list is set forth by way of example and is not exhaustive. Further the additional boost time set forth for each type of laundry is empirically found and so may also be adjusted.

The signal is an analog signal and is timed to provide a signal of the appropriate signal duration as set forth in Table 1. Alternatively, the signal could be of a differing voltage level. Further still, rather than a user actuated signal of the person operating the laundry machine blocks 15(a)–15(h), conductivity sensors may measure the contamination of the water within the laundry machine itself and provide the signal. In the present invention, the monitoring means for the contamination points comprises laundry controllers 14a–14h and may include a commercially available controller from Ecolab Inc., of Minnesota (the assignee of the present invention) under model designations T-JET 2000 or AeroJet. Another type of controller which might be used in connection with the present invention is known by the ACCUJET designation. Although these controllers are used to provide the signal from the various signal washers 15(a)–15(h) via connections 15(a)–15(h) respectively, other commercially available washer controllers might be used, as well as personal computers, electronic controllers, programmable logic controllers. For example, while FIG. 1 illustrates a plurality of laundry controllers 14a–14h, a single controller might be used to control the introduction of chemicals into the washers 15a–15h and the operation thereof. These and other devices with the functionality to transmit a signal indicative of the type of contaminants which will be introduced into the waste water and feed such signal forward to the controller 60 may be used. Also, it will be further appreciated that dispensers that generate digital signals rather than analog signals might be used.

As noted above, in the preferred embodiment the signal from the monitoring means provides a timed signal which increases in duration with amount of expected contamination of the waste water discharged from the contamination point (e.g. washer 15(a)–15(h). The signals are received by the input timer block 61 and converted on the basis of each second of the signal corresponds to one minute of boosted or increased injected chemicals. The converted signal is then provided to delay block 22 to associate the boosted delivery of chemicals to the appropriate time of when the contaminated waste water will be delivered to the DAF tank 23. This information is provided to the control logic block 63 where after the appropriate delay, both pump outputs are increased using a non-linear six step algorithm. The signal from the control logic is output via digital to analog converter block 69. The resulting control signals from block 69 are provided to first and second pumps 27 and 28 via lines 52 and 53 respectively. As additional input to the control logic block 63, A–D converter block 64 provides a flow meter signal (received via line 51) to increase the rate of the pumps if additional waste water above the normal level is being provided.

While not specifically detailed in the figures, it will be understood that the functional blocks, and other devices are properly connected to appropriate reference supplies and other attendant devices so as to operate in their intended manner. Additionally, it will be understood that generally in FIG. 1 the fluid paths are designated by double line designations while electrical connections are designated by a single line. In a preferred embodiment of a device constructed according to the principles of the present invention, the controller 60 is manufactured by Automation Direct (KOYO Industries Limited) of Georgia under the model designation Direct Logic 205. However, other controllers might be utilized. For example, a personal computer of the IBM compatible or Apple compatible types might be used. In such an event, the programming may take the form of a number of programming languages and the CPU may be utilized in connection with interface boards to provide for the various inputs and outputs described above.

Figure 3A:
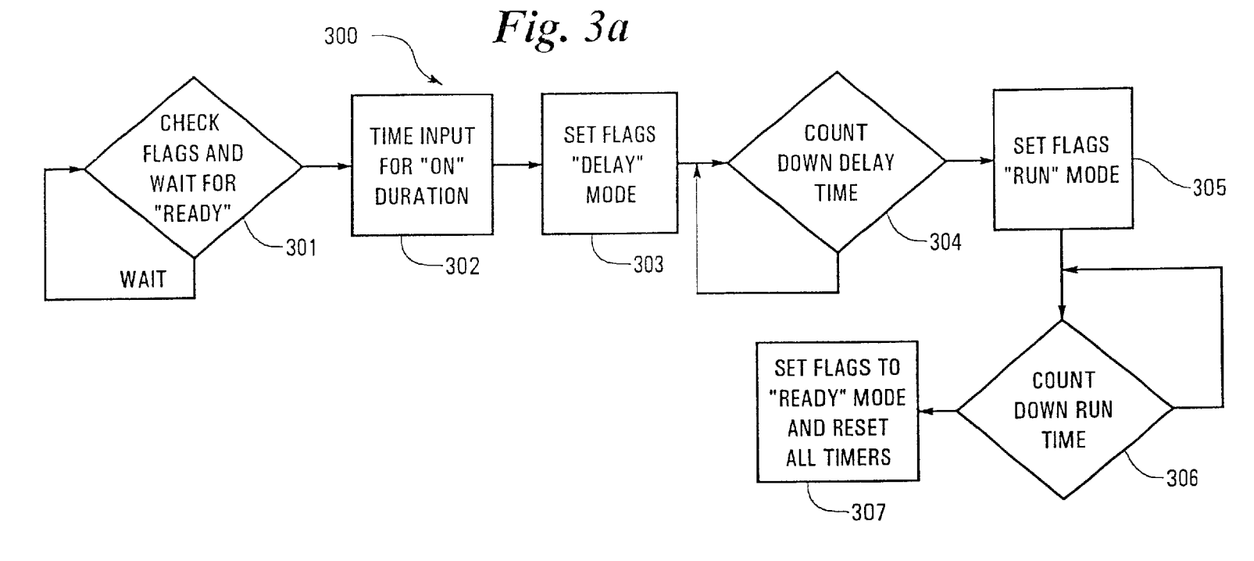
FIGS. 3a and 3b are logic flow diagrams of preferred programming steps operated on by the controller 60 of the present invention.
Figure 3B:
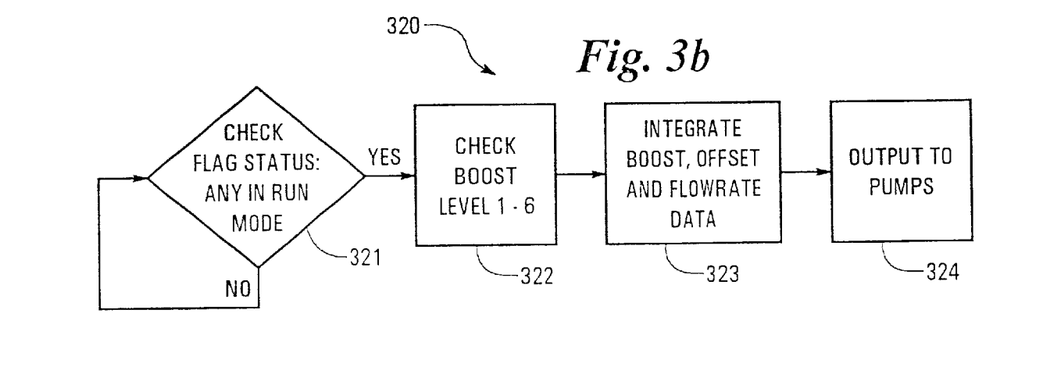

Now turning to FIGS. 3a and 3b, the logical steps which are acted on by the controller 60 are set forth. It will be appreciated that although the discussion presented herein describe the controller 60 as proceeding from block to block, the actual operation of controller 60 may be properly characterized as processing a number of programming instructions or steps in accordance with a sequence of programming steps. In a preferred embodiment, the controller 60 uses a ladder logic type programming language. In an alternative embodiment, the controller 60 uses a "think and do" logic type controller software. The latter type of software is an enhanced language software which is a functional based software program commercially available from Automation Direct of Georgia.

FIG. 3a illustrates the logical programming steps of the controller 60 to process the input data from the monitoring means of the contamination points (i.e., the signals from the washers 15a through 15h in the preferred embodiment). The programming steps are shown generally at 300. It will be understood that the controller 60 can implement the programming steps 300 for each of the inputs. At block 301, the controller checks the flags and waits for an input signal (designated as "Ready"). When a signal is received, the processor moves to block 302 where the input is timed for its duration (which will be utilized at block 306). At block 303, flags are set and the delay mode is initiated. The appropriate delay is then counted down at block 304. At this block, the delay continues to count down in a loop at block 304 until the appropriate delay is reached. At that time, the processor proceeds to block 305 where a run mode flag is set. At block 306, the appropriate run time is counted down. Next at block 307 the flags are reset to the ready mode and the timers are reset. The program then returns to block 301 for that input.

In FIG. 3b, the logical programming steps of the controller 60 to implement the output section are shown (i.e., provide control signals for the pumps 27 and 28). The programming steps are shown generally at 320. First at block 321, the controller 60 checks for the status of the flags to determine if any of the flags are set to the run mode. If no, the controller loops again to block 321. If yes, the controller 60 proceeds to block 322 where the controller determines if the pumps are already boosted. At block 323, the controller 60 integrates the information relating to current boost, requested additional boost, user specified offset (e.g., user inputs 65 through 68), and current flow rate information to determine the appropriate control signals to the pumps. In the preferred embodiment, the controller selects from one of six non-linear steps for the pump speeds. At block 324, the control signals for the pumps are output.

Figure 4:
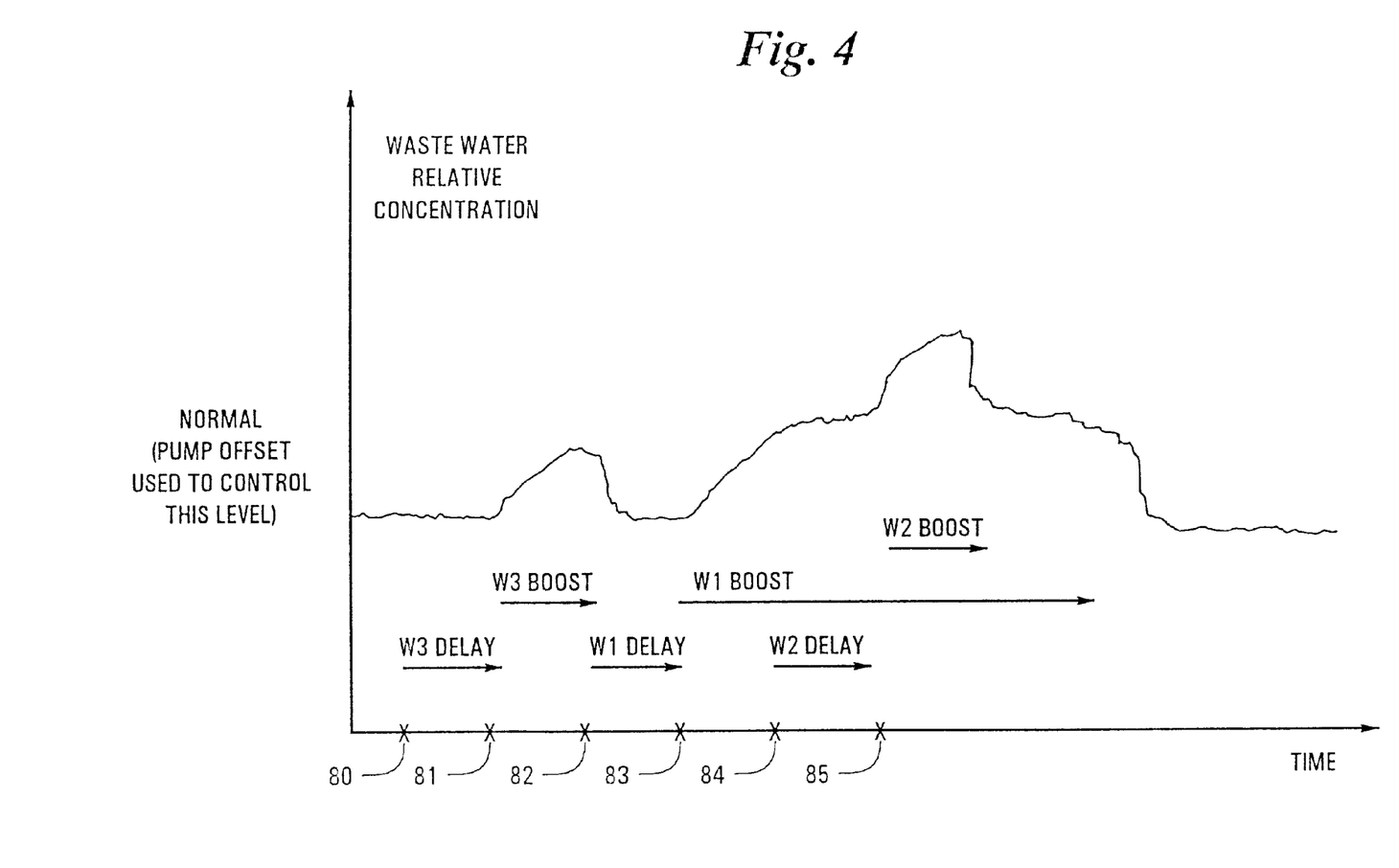
FIG. 4 graphically illustrates the function of the controller 60 in operation in a preferred environment.

Turning now to FIG. 4, a graph showing the contamination in the waste water concentration at the DAF tank 23 relative to time is illustrated. Also illustrated relative to time is when a feed forward signal is received by the controller, the associated delay and when the boosted output of the controller 60 is implemented. More specifically, at point 80, washer 3 ($W_3$) provides a signal of X seconds to the input timer 61. The controller 60 interprets the signal to the necessary boost time in minutes and implements the delay between points 80 and 81. At point 81, the boost based on the washer 3 signal is implemented by the control logic 63.

At point 82, washer 1 ($W_1$) initiates a signal for an extended, increased boost of Y seconds based on the type of materials being washed. Controller 60 converts the signal to a desired boost of Y minutes. After the appropriate delay, at point 83, the washer 1 boost begins.

At point 84, washer 2 ($W_2$) also signals that a boost will be needed—based on the contamination which is generated by that washer. This boost request occurs while the boost due to the signal from washer 1 is still in process. Accordingly, after the signal Z from washer 2 is converted and the appropriate delay occurs, the pumps are elevated to second level at point 85 based on these two different boost requirements for a specified period of time.

ALTERNATIVE EMBODIMENT

As an alternative embodiment, a third pump 31 may also be utilized in addition to the first and second pumps 52, 53. The third pump 31 is preferably located upstream of the equalization tank 21. Third pump 31 injects waste water treatment chemicals into the first fluid communication means 20 from a chemical supply 30. Third pump 31 is best seen in phantom in FIG. 1. Input to the third pump is provided via line 54.

In the preferred alternative embodiment, this pump will inject the same chemical as the first pump 27. An objective for adding the pump is to add this chemical or product in a different location. More specifically, the third pump 31 would inject before the equalization tank 21, but after the sump lift pump 19. The reason for splitting the distribution of the chemical between the two areas is to better use the "boost" amount of chemical and to help eliminate changes in the delay based on the equalization tank level. The offset amount of product would still be injected by the first pump 27.

It will be appreciated that in some wastewater treatment applications, if all of the chemical injected by first pump 27 were added before the equalization tank 21, then separation would occur. However, it is believed that by adding only the "boost" amount at that point, the result will be better mixing and a more cost effective use of the treatment chemicals.

In this alternative embodiment, two delay settings are used. The first is the total system delay and will affect second pump 28. The second delay is the delay for the contaminated water to reach the equalization tank 21. This second delay is used for the third pump 31. Accordingly, this second delay does not include the equalization tank or the resulting flow rate.

The above described logic may take on any number of configurations and operational characteristics and are well known in the industry. It is to be understood that even though numerous characteristics and advantages of the present invention have been set forth in the foregoing description, together with details of the structure and function of the invention, the disclosure is illustrative only. Changes may be made in the detail, especially in matters of the control logic, the number of pumps and chemicals injected into the waste water, and the number of contamination points being processed. Other modifications are and alterations are well within the knowledge of those skilled in the art and are to be included within the broad scope of the appended claims.

We claim:

1. An apparatus for controlling the injection of chemicals in a waste water treatment facility, comprising:
   (a) means for monitoring one or more contamination sites and generating a contamination signal in response to the type of contamination, wherein the monitoring means monitors the type of contamination at the contamination site, wherein the means for monitoring is a laundry washer controller generating the contamination signal based at least in part on user entered information on the type of objects being laundered;
   (b) an equalization tank for collecting the waste water from the one or more contamination sites;
   (c) a flow meter for monitoring the volume of waste water discharged from the equalization tank and for generating a flow volume signal;
   (d) a metering device for portioning a chemical into the waste water, the metering device operating in response to a control signal; and
   (e) a controller operatively connected to the monitoring means and the flow meter, the controller receiving the contamination signal and the flow volume signal and generating a control signal for the metering device in response, whereby the amount of chemical for treating the waste water is optimized.

2. The apparatus of claim 1, wherein the metering device is a pump.

3. The apparatus of claim 1, wherein the controller generating a control signal delays the generation of the control signal by the physical delay associated with the waste water moving from the contamination site to an area proximate where the chemical is introduced into the waste water.

4. The apparatus of claim 1, wherein the contamination signal is an analog signal.

5. The apparatus of claim 4, wherein the contamination signal is a feed forward signal which is timed and measured.

6. An apparatus for controlling the introduction of chemicals into waste water from one or more laundry washer sites, comprising:

(a) a monitor device at the one or more laundry washer sites for generating a feed forward signal in response to the type of contamination;

(b) an equalization tank for collecting the waste water from the one or more laundry washer sites;

(c) a reaction tank;

(d) a fluid communication means for directing the waste water from the equalization tank to the reaction tank;

(e) flow meter, installed in the fluid communication means, for monitoring the volume of waste water discharged from the equalization tank and for generating a flow volume signal responsive thereto;

(f) a plurality of pumps for introducing waste water treatment chemicals into the waste water in response to control signals, wherein the pumps introduce the chemicals in the fluid communication means; and (g) a controller operatively connected to the monitor device and the flow meter, the controller receiving the feed forward signal and the flow volume signal and generating a control signal for the pumps in response, wherein the type of contamination is known prior to reaching the reaction tank and whereby the amount of chemical for treating the waste water is optimized.

7. The apparatus of claim 6, wherein there are two pumps which introduce different chemicals.

8. The apparatus of claim 7, wherein there is a third pump which introduces chemicals upstream of the equalization tank.

9. The apparatus of claim 6, wherein the controller delays the generation of the control signal by the physical delay associated with the waste water moving from the one or more laundry washer sites to an area proximate where the chemicals are introduced into the waste water.

* * * * *